(12) United States Patent
Geiger et al.

(10) Patent No.: US 10,488,518 B2
(45) Date of Patent: Nov. 26, 2019

(54) OPTOELECTRONIC MODULE OPERABLE FOR DISTANCE MEASUREMENTS

(71) Applicant: AMS SENSORS SINGAPORE PTE. LTD., Singapore (SG)

(72) Inventors: Jens Geiger, Thalwil (CH); Peter Roentgen, Thalwil (CH); Markus Rossi, Jona (CH); James Eilertsen, Pittsford, NY (US)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/578,350

(22) PCT Filed: May 11, 2016

(86) PCT No.: PCT/SG2016/050219
§ 371 (c)(1),
(2) Date: Nov. 30, 2017

(87) PCT Pub. No.: WO2016/195592
PCT Pub. Date: Dec. 8, 2016

(65) Prior Publication Data
US 2018/0149751 A1    May 31, 2018

Related U.S. Application Data

(60) Provisional application No. 62/170,412, filed on Jun. 3, 2015.

(51) Int. Cl.
*G01S 17/46* (2006.01)
*G01S 17/36* (2006.01)
(Continued)

(52) U.S. Cl.
CPC ............ *G01S 17/46* (2013.01); *G01S 7/4813* (2013.01); *G01S 7/4814* (2013.01);
(Continued)

(58) Field of Classification Search
CPC .......... G01S 17/46; G01S 17/08; G01S 17/36; G01S 7/4813; G01S 7/4814; G01S 7/4815
See application file for complete search history.

(56) References Cited

U.S. PATENT DOCUMENTS

| 4,297,701 A | 10/1981 | Henriques |
| 4,516,020 A | 5/1985 | Simpson et al. |
(Continued)

FOREIGN PATENT DOCUMENTS

| EP | 2821748 | 1/2015 |
| TW | 1432768 | 4/2014 |
(Continued)

OTHER PUBLICATIONS

European Patent Office; Supplementary European Search Report mailed in counterpart European patent application No. 16803861 (dated Apr. 27, 2018).

(Continued)

*Primary Examiner* — Dominic J Bologna
(74) *Attorney, Agent, or Firm* — Michael Best & Friedrich LLP

(57) ABSTRACT

Various optoelectronic modules are described that include an emitter operable to produce light (e.g., electromagnetic radiation in the visible or non-visible ranges), an emitter optical assembly aligned with the emitter so as to illuminate an object outside the module with light produced by the emitter, a detector operable to detect light at one or more wavelengths produced by the emitter, and a detector optical assembly aligned with the detector so as to direct light reflected by the object toward the detector. In some implementations, the modules include features for expanding or shifting the linear photocurrent response of the detector.

8 Claims, 11 Drawing Sheets

(51) Int. Cl.
*G01S 7/481* (2006.01)
*G01S 17/08* (2006.01)
(52) U.S. Cl.
CPC ............ *G01S 7/4815* (2013.01); *G01S 17/08* (2013.01); *G01S 17/36* (2013.01)

(56) References Cited

U.S. PATENT DOCUMENTS

| | | | | |
|---|---|---|---|---|
| 4,636,053 | A * | 1/1987 | Sakane | G03B 3/10 250/214 A |
| 5,488,468 | A * | 1/1996 | Kawanishi | G01B 11/026 356/3.02 |
| 5,668,631 | A * | 9/1997 | Norita | G01B 11/2518 250/559.22 |
| 5,870,180 | A | 2/1999 | Wangler | |
| 6,782,122 | B1 * | 8/2004 | Kline | G01F 23/292 250/223 B |
| 7,859,651 | B2 | 12/2010 | Gunther et al. | |
| 8,964,028 | B2 | 2/2015 | Oggier | |
| 9,329,035 | B2 | 5/2016 | Oggier | |
| 2012/0162197 | A1 | 6/2012 | Park et al. | |
| 2012/0176596 | A1 * | 7/2012 | Reime | G01S 7/4816 356/5.01 |
| 2013/0271744 | A1 * | 10/2013 | Miller | G01C 3/08 356/4.01 |
| 2014/0191114 | A1 * | 7/2014 | Russo | G01S 17/08 250/208.2 |
| 2014/0240689 | A1 | 8/2014 | Arbouzov | |
| 2015/0323670 | A1 * | 11/2015 | Shirasaka | G01P 13/00 250/206.1 |
| 2015/0334282 | A1 * | 11/2015 | Tan | G06K 7/10801 348/360 |
| 2015/0362586 | A1 * | 12/2015 | Heinrich | G01S 17/08 356/5.01 |
| 2016/0084651 | A1 * | 3/2016 | Hinderling | H01L 31/10 356/4.01 |
| 2016/0299218 | A1 | 10/2016 | Lehmann | |

FOREIGN PATENT DOCUMENTS

| | | |
|---|---|---|
| TW | 1434059 | 4/2014 |
| WO | WO 2015/053708 | 4/2015 |
| WO | WO 2015/076750 | 5/2015 |

OTHER PUBLICATIONS

International Search Report of ISA/AU for PCT/SG2016/050219 (dated Aug. 22, 2016).
Taiwan Search Report issued for Taiwan Appln. No. 105117465 (dated May 25, 2017) (with English translation).

* cited by examiner

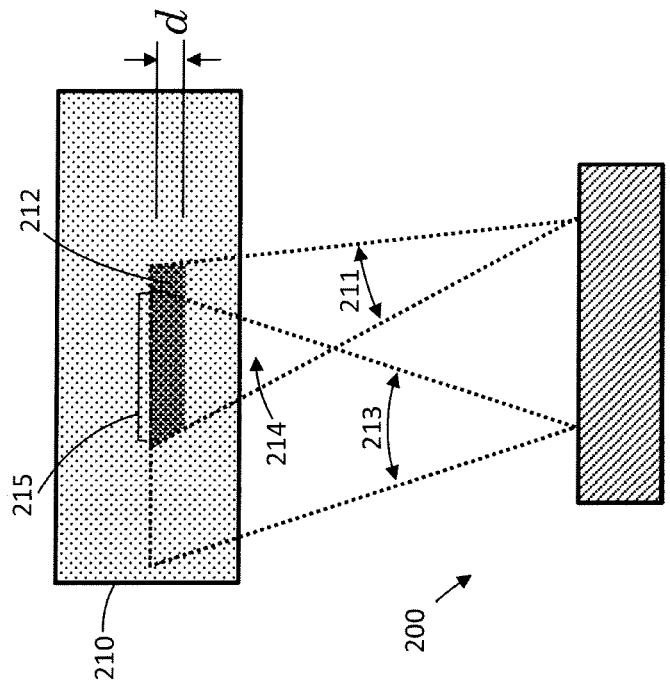
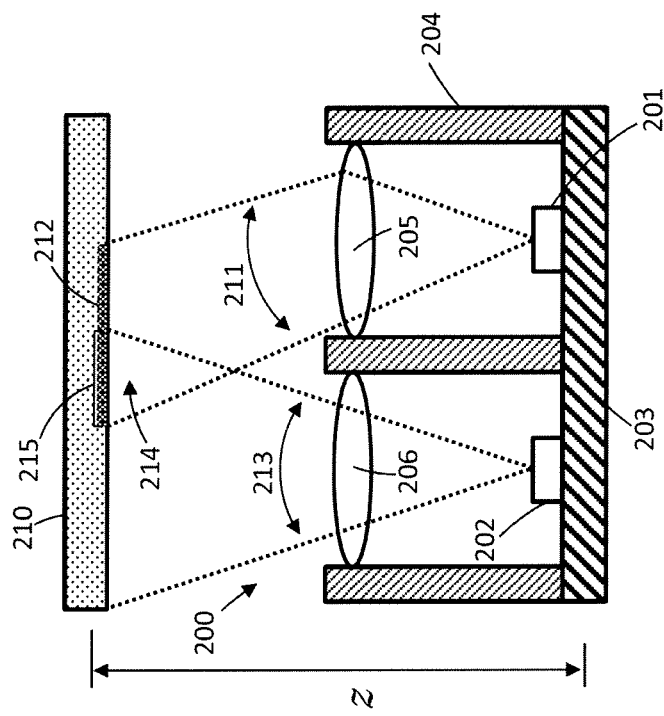
FIG. 2B
FIG. 2A

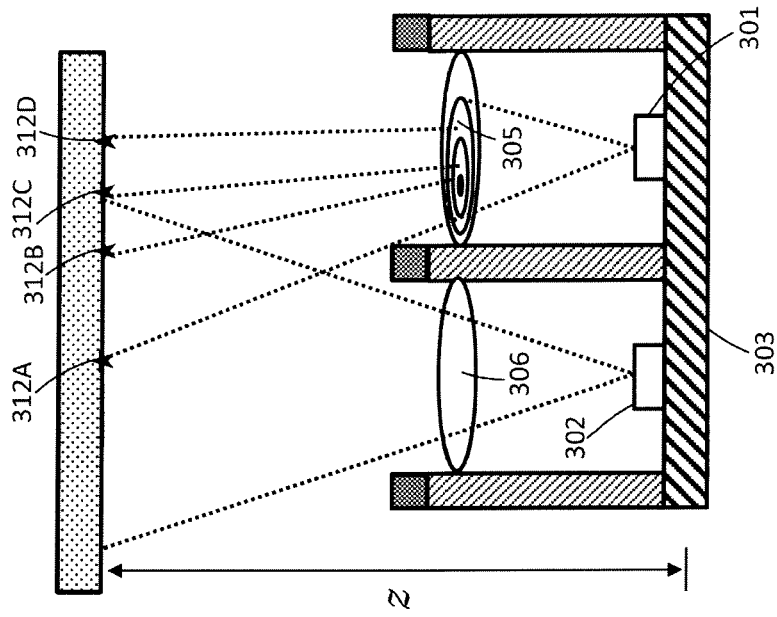
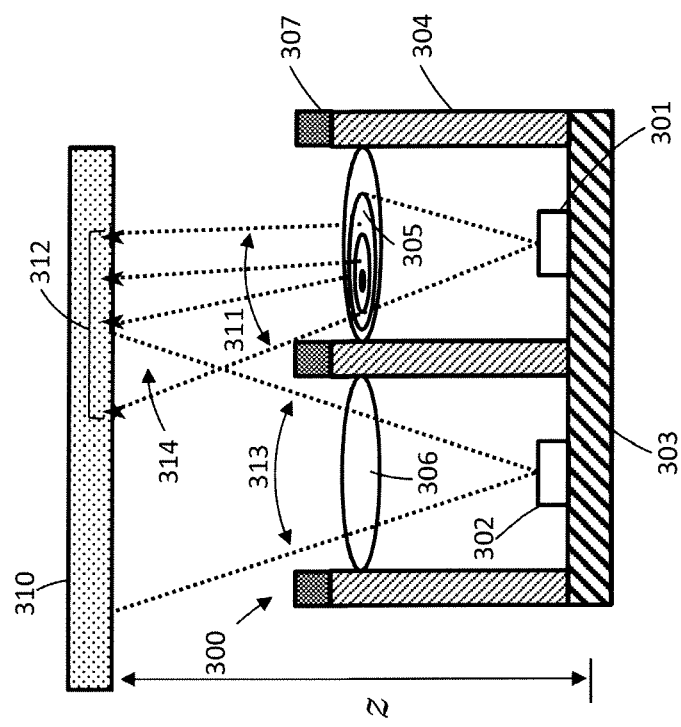

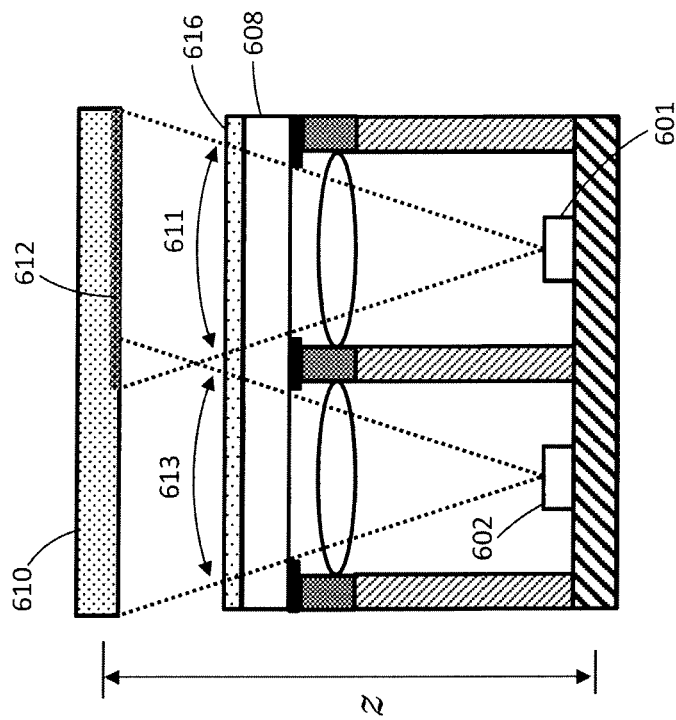
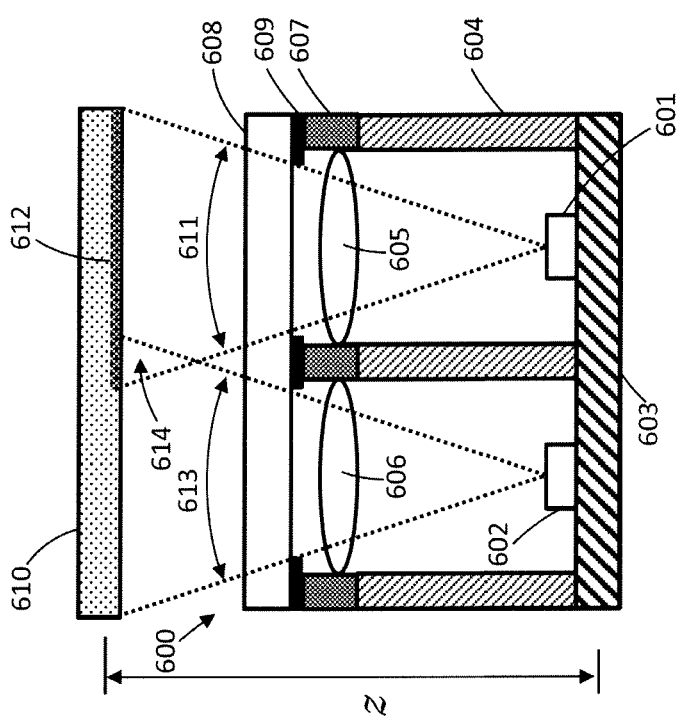

OPTOELECTRONIC MODULE OPERABLE FOR DISTANCE MEASUREMENTS

CROSS-REFERENCE TO RELATED APPLICATION(S)

This application claims the benefit of priority of U.S. Provisional Patent Application No. 62/170,412 filed on Jun. 3, 2015, the disclosure of which is incorporated herein in its entirety.

TECHNICAL FIELD

This disclosure relates to optoelectronic modules operable to capture distance data.

BACKGROUND

Optoelectronic modules operable to capture distance data, e.g., distance of an object from the optoelectronic module, can employ emitters and detectors. Light produced by the emitters and reflected by the object can be detected by the detectors. The response of the detector, i.e., the photocurrent response can be correlated with a distance to the object. For some distance ranges, the photocurrent response tends to be linear with respect to distance. The linear region of the photocurrent response can be the ideal range from which to derive accurate, precise distance data. Further, the linear region of the photocurrent response can be robust with respect to variations of emitter, detector efficiencies, and/or object reflectivity. Accordingly, it would be an advantage to increase the range of distances for which the photocurrent response is linear as described above. Further, the linear zone may not commence at a zero distance position. However, in some instances, it can be advantageous to shift the linear zone such that it commences at a zero distance position. For example, smaller distances (i.e., distances between an optoelectronic module operable to capture distance data and an object) can be measured, determined at a closer distance with greater accuracy, precision when the linear region of the photocurrent response is shifted toward a position closer to a zero distance. Still in other instances, it can be advantageous to shift the linear zone such that it commences at particularly large distances.

SUMMARY

This disclosure describes various implementations for expanding or shifting the linear photocurrent response of a detector in an optoelectronic module.

For example, in one aspect, various optoelectronic modules are described that include an emitter to produce light (e.g., electromagnetic radiation in the visible or non-visible ranges), an emitter optical assembly aligned with the emitter so as to illuminate an object outside the module with light produced by the emitter, a detector to detect light at one or more wavelengths produced by the emitter, and a detector optical assembly aligned with the detector so as to direct light reflected by the object toward the detector. The modules include components operable to expand or shift the linear photocurrent response of the detector.

In accordance with some implementations, the emitter optical assembly includes an anamorphic lens element. In some instances, the anamorphic lens element tilts an emitter field of view toward the detector. Further, in some cases, an intensity of the illumination on the object varies laterally.

In accordance with other implementations, the emitter optical assembly includes a diffractive lens element. In some instances, the illumination on the object appears as discrete illumination features. Further, in some cases, each one of the discrete illumination features produces a respective stepped photocurrent response when detected by the detector. In some implementations, each one of the discrete illumination features has a same dimension as the other discrete illumination features. On the other hand, in some implementations, each one of the discrete illumination features or respective subsets of the discrete illumination features can have a dimension that differs from other ones of the discrete illumination features. Also, in some instances, each one of the discrete illumination features or respective subsets of the discrete illumination features has an intensity that differs from other ones of the discrete illumination features. The illumination on the object may take the form, for example, of geometric shapes or a series of shapes.

In accordance with a further implementation, the optoelectronic module includes a filter disposed over at least the emitter optical assembly. In some cases, the filter is a spectral filter disposed over the emitter optical assembly as well as over the detector optical assembly. The spectral filter can be disposed, for example, on a cover glass over the emitter and detector optical assemblies.

In accordance with another implementation, the emitter optical assembly includes a diffuser.

In accordance with another aspect, an optoelectronic module includes multiple emitters to produce light. A first one of the emitters is operable to be activated for detecting the object at a first distance range from the module, and a second one of the emitters is operable to be activated for detecting the object at a second distance range from the module. In some instances, the emitters are operable to be activated sequentially. Further, in some cases, the emitters produce light of different wavelengths from one another.

In accordance with yet another aspect, an optoelectronic module is operable in a first mode and in a second mode. In the first mode, an increase in lateral overlap of an emitter field of view and a detector field of view results in an increase in intensity of light reflected from the object and collected by the detector, and a photocurrent response of the detector is correlated to a distance between the optoelectronic module and the object. In the second mode, the detector detects a phase shift based on light reflected from the object, the phase shift being correlated to a distance between the optoelectronic module and the object. In some cases, the module operates in the first mode when the distance between the module and the object correlates to a linear region of the detector's photocurrent response. The module can be activated to operate in the second mode, for example, when the distance between the module and the object correlates to a non-linear region of the detector's photocurrent response.

Other aspects, features and advantages will be readily apparent from the following detailed description, the accompanying drawings, and the claims.

BRIEF DESCRIPTION OF THE DRAWINGS

FIG. 2A and FIG. 2B depict an optoelectronic module with an anamorphic emitter optical assembly.

FIG. 3A and FIG. 3B depict an optoelectronic module with a diffractive emitter optical assembly.

FIG. 6A and FIG. 6B depict additional implementations of an optoelectronic module operable to capture distance data.

DETAILED DESCRIPTION

Figure 1B:
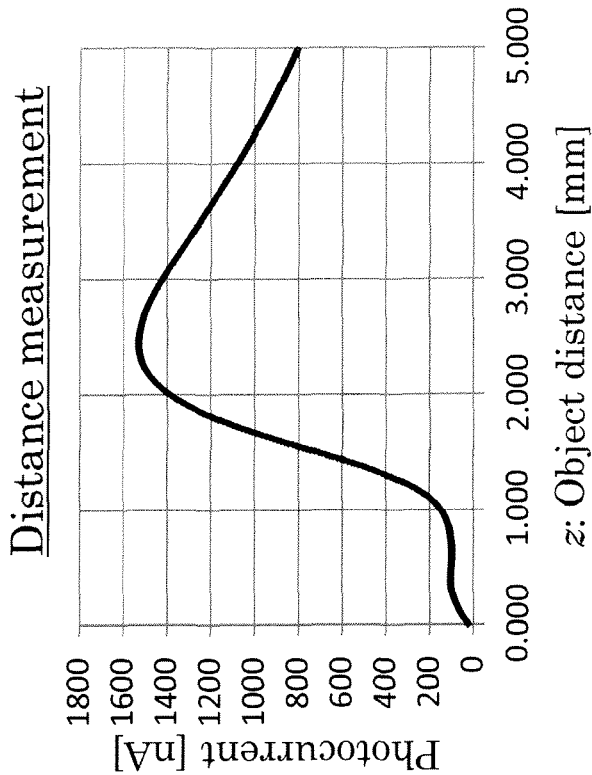
FIG. 1B depicts an example plot of photocurrent response with respect to a range of target distances.
Figure 1A:
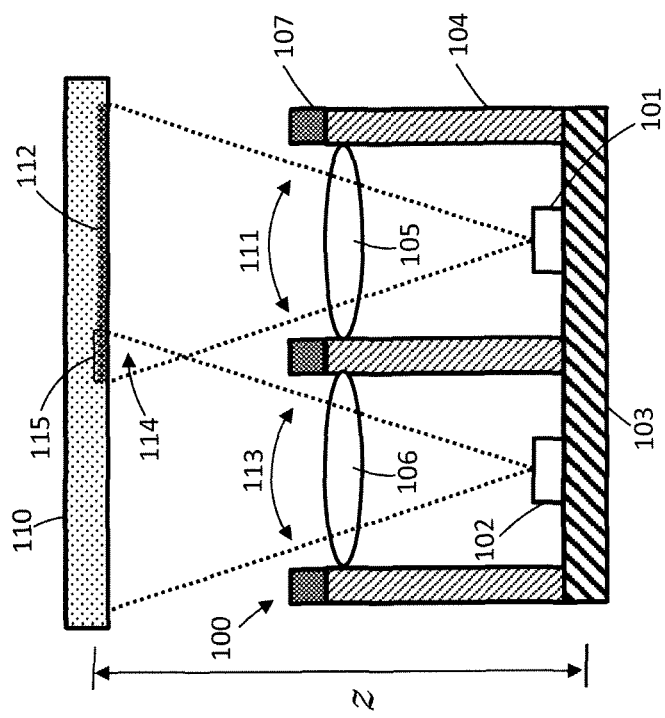
FIG. 1A depicts an optoelectronic module operable for distance measurements.

FIG. 1A depicts an optoelectronic module 100 operable to capture distance data. The optoelectronic module 100 includes an emitter 101 (such as a light emitting diode, edge emitting laser (EEL), vertical-cavity surface-emitting laser (VCSEL), or an array or combination of any of the aforementioned) and a detector 102 (such as a photodiode, intensity pixel, demodulation pixel, or an array or combination of any of the aforementioned) mounted on or integrated into a substrate 103 (such as PCB glass-fiber laminate, and/or silicon). The emitter 101 can be configured to produce any wavelength or range of wavelengths of electromagnetic radiation (e.g., visible or non-visible radiation such as near-, mid-, or far-infrared radiation), which may be referred to as "light." Further the emitter 101 can be configured to produce modulated light. Further the detector 102 can be configured to detect any wavelength or range of wavelengths of electromagnetic radiation (e.g., visible or non-visible radiation such as near-, mid-, or far-infrared radiation).

The emitter 101 and detector 102 can be surrounded laterally by a spacer 104. The spacer 104 is substantially non-transparent to wavelengths of light emitted by the emitter 101 and/or detectable by the detector 102. The spacer 104 can be manufactured, for example, from a curable polymeric material (such as epoxy) via injection molding, vacuum injection molding or other replication process, and can further contain substantially non-transparent filler and/or low-thermal-expansion filler (such as carbon black and/or inorganic filler). Further the spacer 104 can be manufactured from a substantially non-transparent wafer (such as a PCB glass-fiber laminate).

The optoelectronic module 100 further includes an emitter optical assembly 105 aligned with the emitter 101, and a detector optical assembly 106 aligned with the detector 102. Each optical assembly 105, 106 can include any one of, or combinations of, the following optical elements: a diffraction grating, a microlens array, a lens, an anamorphic lens, a prism, a micro-prism array, a diffractive optical element or a plurality of any one of the aforementioned or their respective combinations. The optical elements within the optical assemblies 105, 106 can be manufactured from a curable polymeric material (such as epoxy) via injection molding, vacuum injection molding, or other replication process.

Each optical assembly 105, 106 can further include apertures, filters, spacers, alignment features, and other components pertinent to their respective functions. The optical assemblies 105, 106 can be mounted to or integrated within the spacer 104. The optoelectronic module 100 further can include a baffle 107. The baffle 107 also can be substantially non-transparent to wavelengths of light emitted by the emitter 101 and/or detectable by the detector 102. The baffle 107 can be manufactured, for example, from a curable polymeric material (such as epoxy) via injection molding, vacuum injection molding or other replication process, and can further contain substantially non-transparent filler and/or low-thermal-expansion filler (such as carbon black and/or inorganic filler). Further, the baffle 107 can be manufactured from a substantially non-transparent wafer (such as a PCB glass-fiber laminate). The baffle 107 can mitigate the detrimental effects of stray light in some implementations. Further the baffle 107 can be configured with dimensions (e.g., height, thickness) that substantially prevent stray light from impinging the detector, while still allowing for optimal emitter, detector FOV 111, 113, respectively.

FIG. 1A further depicts an object 110 (such as a person or an appendage of a person) adjacent to the optoelectronic module 100 at a distance z. Light emanating from the emitter 101 and transmitting through the emitter optical assembly 105 conforms to an emitter field-of-view (FOY) 111. Further, light conforming to the emitter FOV 111 and incident on the object 110 delineates an illumination 112. Light that reflects from the object 110 can be detected by the detector 102 via the detector optical assembly 106 within a detector FOV 113. The regions where the emitter FOV 111 and the detector FOV 113 overlap delineate an overlap region 114. The lateral extent of the overlap region 114 defines a lateral overlap 115. Light reflected from the lateral overlap 115 and directed to the detector 102 can be used to determine distance in some implementations. For example, an increase in object distance z, generates a corresponding increase in the overlap region 114 and a corresponding increase in the lateral overlap 115. An increase in the lateral overlap 115 can result in an increase in intensity of light reflected from the object 110 and collected by the detector 102. A detector 102 photocurrent response with respect to a range of distances can be correlated to the distance z between the optoelectronic module 100 and the object 110.

FIG. 1B depicts an example plot of the detector 102 photocurrent response with respect to a range of distances z between the optoelectronic module 100 and the object 110. There are approximately three zones within this example plot: a first zone occurs for distances z between approximately 0 and 1.0 mm, a second zone occurs for distances z between approximately 1.0 mm and 2.0 mm, and a third zone occurs for distances z greater than 2.0 mm. In other examples, the zones can occur at different distances z. Further in other examples, different number of zones can occur. In the illustrated example, the first and second zones exhibit a respective non-liner and linear increase in photocurrent with respect to distance z. Further, the third zone exhibits a non-linear decrease in photocurrent with respect to distance z. The photocurrent response exhibited by zone two, specifically a linear response with respect to distance z, can be particularly advantageous in some implementations for capturing distance data.

An optoelectronic module configured to yield a linear response (as in the second zone) can measure distance data with improved accuracy. For example, optoelectronic modules produced via the same assembly/manufacturing processes are inherently subject to dimensional variations (e.g., resulting from assembly tolerances). Dimensional variations can result in a left-right shift of the plot depicted in FIG. 1B. Further, other variations of optoelectronic modules (e.g., variations of the emitter 101 and/or detector 102 efficiencies) can result in a top-bottom shift of the plot depicted in FIG. 1B. Still further, variations in the object characteristics (e.g., the reflectivity of the object) can further result in a top-bottom shift of the plot depicted in FIG. 1B. Some of the aforementioned variations (e.g., dimensional variations and/or variations in emitter and/or detector efficiencies) can be mitigated with a calibration procedure; however, other differences (such as differences in object reflectivity) may not be mitigated readily with a calibration procedure. Nevertheless, distances (in particular, relative distance changes) within the second zone, the linear zone described above, are measured with particular accuracy regardless of e.g., the reflectivity of the object 110. Consequently, many implementations described, utilize and/or expand and/or shift the linear zone for distance measurements with improved accuracy.

FIG. 2A depicts an optoelectronic module 200 operable to capture distance data. The optoelectronic module 200 includes an emitter 201 (such as a light emitting diode, edge emitting laser (EEL), vertical-cavity surface-emitting laser (VCSEL), or an array or combination of any of the aforementioned) and a detector 202 (such as a photodiode, intensity pixel, demodulation pixel, or an array or combination of any of the aforementioned) mounted on or integrated into a substrate 203 (such as PCB glass-fiber laminate, and/or silicon). The emitter 201 can be configured to produce any wavelength or range of wavelengths of electromagnetic radiation (e.g., visible or non-visible radiation such as near-, mid-, or far-infrared radiation). Further the emitter 201 can be configured to produce modulated light. Further the detector 202 can be configured to detect any wavelength or range of wavelengths of electromagnetic radiation (e.g., visible or non-visible radiation such as near-, mid-, or far-infrared radiation).

The emitter 201 and detector 202 can be surrounded laterally by a spacer 204. The spacer 204 is substantially non-transparent to wavelengths of light emitted by the emitter 201 and/or detectable by the detector 202. The spacer 204 can be manufactured, for example, from a curable polymeric material (such as epoxy) via injection molding, vacuum injection molding or other replication process, and can further contain substantially non-transparent filler and/or low-thermal-expansion filler (such as carbon black and/or inorganic filler). Further the spacer 204 can be manufactured from a substantially non-transparent wafer (such as a PCB glass-fiber laminate).

The optoelectronic module 200 further includes an emitter optical assembly 205 aligned with the emitter 201, and a detector optical assembly 206 aligned with the detector 202. Each optical assembly 205, 206 can include any one of, or combinations of, the following optical elements: a diffraction grating, a microlens array, a lens, an anamorphic lens, a prism, a micro-prism array, a diffractive optical element or a plurality of any one of the aforementioned or their respective combinations. The optical elements within the optical assemblies 205, 206 can be manufactured, for example, from a curable polymeric material (such as epoxy) via injection molding, vacuum injection molding, or other replication process.

Each optical assembly 205, 206 can further include apertures, spectral filters, spacers, alignment features, and other components pertinent to their respective functions. The optical assemblies 205, 206 can be mounted or integrated within the spacer 204. The optoelectronic module 200 further can include a baffle 207. The baffle 207 is substantially non-transparent to wavelengths of light emitted by the emitter 201 and/or detectable by the detector 202. The baffle 207 can be manufactured from a curable polymeric material (such as epoxy) via injection molding, vacuum injection molding or other replication process, and can further contain substantially non-transparent filler and/or low-thermal-expansion filler (such as carbon black and/or inorganic filler). Further the baffle 207 can be manufactured from a substantially non-transparent wafer (such as a PCB glass-fiber laminate). The baffle 207 can mitigate the detrimental effects of stray light in some implementations. Further the baffle 207 can be configured with dimensions (e.g., height, thickness) that substantially prevent stray light from impinging the detector, while still allowing for optimal emitter, detector FOV 211, 213, respectively.

FIG. 2A further depicts an object 210 (such as a person or an appendage of a person) adjacent to the optoelectronic module 200 at a distance z. Light emanating from the emitter 201 and transmitting through the emitter optical assembly 205 conforms to an emitter FOV 211. Further light conforming to the emitter FOV 211 and incident on the object 210 delineates an illumination 212. Light that reflects from the object 210 can be detected by the detector 202 via the detector optical assembly 206 within a detector FOV 213. The regions where the emitter FOV 211 and the detector FOV 213 overlap delineate an overlap region 214. The lateral extent of the overlap region 214 defines a lateral overlap 215. Light reflected from the lateral overlap 215 and directed to the detector 202 can be used to determine distance in some implementations. The emitter optical assembly 205 of the optoelectronic module 200 depicted in FIG. 2A is depicted with an anamorphic lens. The anamorphic lens can be operable to transmit light emanating from the emitter 201. The transmitted light can define the illumination 212 (or can define the illumination 212 in concert with other elements of the emitter optical assembly 205). An example of such an illumination is depicted in FIG. 2B.

FIG. 2B depicts the optoelectronic module 200 in which the emitter optical assembly 205 has an anamorphic lens. Light transmitted from the emitter optical assembly 205 with the anamorphic lens conforms to the emitter FOV 211. In some implementations, as depicted in FIG. 2B, the emitter FOV 211 can be tilted in order to increase the zone of linear response (i.e., the distance range where a linear change in photocurrent is generated) of the detector 202 as described above. For example, the emitter FOV 211 tilted toward the detector 202 (as depicted in FIG. 2B) can expand and/or shift the lower distance z limit of the linear zone. That is, the tilted emitter FOV 211 can increase the lateral overlap 215 at shorter distances z.

Still further, as depicted in FIG. 2B, the emitter optical assembly 205 can be configured to produce the illumination 212, where the illumination 212 conforms to a particular dimension d. For example, the dimension d can be small (e.g., a fraction) relative to the lateral dimension of the illumination 212. In some instances, the dimension d can be configured such that light emanating from the emitter 201 is utilized in a particularly efficient manner. Further, the intensity of the illumination 212 can vary laterally such that the linear zone is enlarged. Still further, in other implementations, the dimension d and/or intensity of the illumination 212 can be varied to achieve an increase in the linear zone, and/or a shift in the linear zone (e.g., closer to a zero distance position), and/or the utilization of light emanating from the emitter 201 in a particularly efficient manner.

FIG. 3A depicts an optoelectronic module 300 operable to capture distance data. The optoelectronic module 300 includes an emitter 301 (such as a light emitting diode, edge emitting laser (EEL), vertical-cavity surface-emitting laser (VCSEL), or an array or combination of any of the aforementioned) and a detector 302 (such as a photodiode, intensity pixel, demodulation pixel, or an array or combination of any of the aforementioned) mounted on or integrated into a substrate 303 (such as PCB glass-fiber laminate, and/or silicon). The emitter 301 can be configured to produce any wavelength or range of wavelengths of electromagnetic radiation (e.g., visible or non-visible radiation such as near-, mid-, or far-infrared radiation). Further the emitter 301 can be configured to produce modulated light. Further the detector 302 can be configured to detect any wavelength or range of wavelengths of electromagnetic radiation (e.g., visible or non-visible radiation such as near-, mid-, or far-infrared radiation).

The emitter 301 and detector 302 can be surrounded laterally by a spacer 304. The spacer 304 is substantially non-transparent to wavelengths of light emitted by the emitter 301 and/or detectable by the detector 302. The spacer 304 can be manufactured, for example, from a curable polymeric material (such as epoxy) via injection molding, vacuum injection molding or other replication process, and can further contain substantially non-transparent filler and/or low-thermal-expansion filler (such as carbon black and/or inorganic filler). Further the spacer 304 can be manufactured from a substantially non-transparent wafer (such as a PCB glass-fiber laminate).

The optoelectronic module 300 further includes an emitter optical assembly 305 aligned with the emitter 301, and a detector optical assembly 306 aligned with the detector 302. Each optical assembly 305, 306 can include any one of, or combinations of, the following optical elements: a diffraction grating, a microlens array, a lens, an anamorphic lens, a prism, a micro-prism array, a diffractive optical element or a plurality of any one of the aforementioned or their respective combinations. The optical elements within the optical assemblies 305, 306 can be manufactured from a curable polymeric material (such as epoxy) via injection molding, vacuum injection molding, or other replication process.

Each optical assembly 305, 306 can further include apertures, spectral filters, spacers, alignment features, and other components pertinent to their respective functions. The optical assemblies 305, 306 can be mounted or integrated within the spacer 304. The optoelectronic module 300 further can include a baffle 307. The baffle 307 is substantially non-transparent to wavelengths of light emitted by the emitter 301 and/or detectable by the detector 302. The baffle 307 can be manufactured from a curable polymeric material (such as epoxy) via injection molding, vacuum injection molding or other replication process, and can further contain substantially non-transparent filler and/or low-thermal-expansion filler (such as carbon black and/or inorganic filler). Further the baffle 307 can be manufactured from a substantially non-transparent wafer (such as a PCB glass-fiber laminate). The baffle 307 can mitigate the detrimental effects of stray light in some implementations. Further the baffle 307 can be configured with dimensions (e.g., height, thickness) that substantially prevent stray light from impinging the detector, while still allowing for optimal emitter, detector FOV 311, 313, respectively.

FIG. 3A further depicts an object 310 (such as a person or an appendage of a person) adjacent to the optoelectronic module 300 at a distance z. Light emanating from the emitter 301 and transmitting through the emitter optical assembly 305 conforms to an emitter FOV 311. Further light conforming to the emitter FOV 311 and incident on the object 310 delineates an illumination 312. Light that reflects from the object 310 can be detected by the detector 302 via the detector optical assembly 306 within a detector FOV 313. The regions where the emitter FOV 311 and the detector FOV 313 overlap delineate an overlap region 314. The lateral extent of the overlap region 314 defines a lateral overlap 315. Light reflected from the lateral overlap 315 and directed to the detector 302 can be used to determine distance in some implementations. The emitter optical assembly 305 of the optoelectronic module 300 depicted in FIG. 3A is depicted with a diffractive lens element. The diffractive lens element can be operable to transmit light emanating from the emitter 301. The transmitted light can define the illumination 312 (or can define the illumination 312 in concert with other elements of the emitter optical assembly 305). In FIG. 3A the illumination 312 is symbolically represented as a plurality of stars. The illumination 312 can take the form of any geometric shape or series of shapes such as bars, dots, circular shapes, ellipses, or their respective combination. An example of such an illumination is depicted in FIG. 3A and FIG. 3B. The illumination 312 can be composed of discrete illumination features 312A, 312B, 312C and 312D. In some cases, discrete illumination features can produce a stepped photocurrent response, for example, where each step (i.e., a threshold current) can correspond to a distance z, or within a particular range of z. A stepped photocurrent response and/or discrete illumination features can obviate the need for a calibration step in some implementations (e.g., a calibration step designed to mitigate differences/variations of emitter and/or detector efficiencies between optoelectronic modules produced, for example, on the wafer level/wafer-scale).

FIG. 3B depicts the optoelectronic module 300 and the object 310 at a different distance z with respect to the distance z depicted in FIG. 3A. In this example, the illumination 312 is symbolically represented as a plurality of stars (i.e., illumination features 312A-312D). The illumination 312 can take the form of any geometric shape or series of shapes such as bars, dots, circular shapes, ellipses, or their respective combination. In this example, one illumination feature 312A is cast onto the object 310 within the overlap region 314 in FIG. 3A. Two illumination features 312A, 312B are cast onto the object 310 within the overlap region 314. Accordingly, the lateral overlap 315 reflects twice as much light at the distance z depicted in FIG. 3B than at the distance z depicted in FIG. 3A. The number, interval, shape, intensity, and dimensions of the illumination features (e.g., 312A, 312B, 312C and 312D) can be configured for different implementations such that an increase in the linear zone, and/or a shift in the linear zone, and/or the utilization of light emanating from the emitter 301 in a particularly efficient manner is achieved.

Figure 3D:
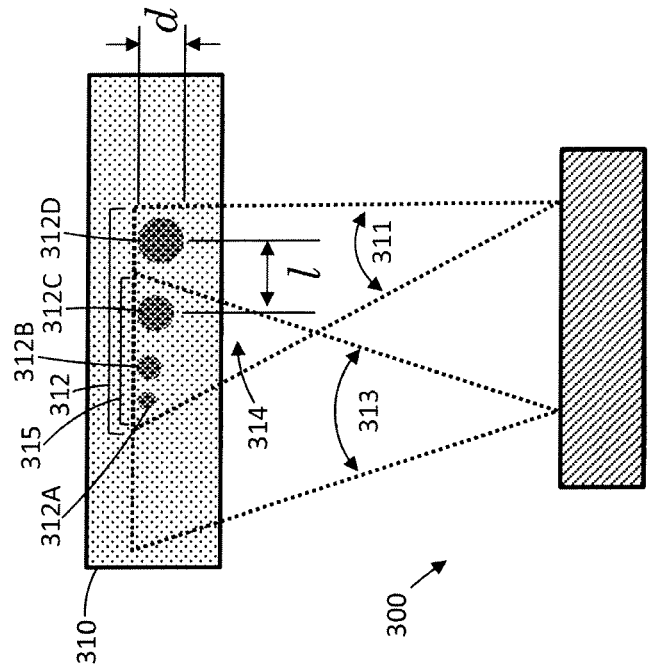
FIG. 3C and FIG. 3D depict example illumination features resulting from the diffractive emitter optical assembly.
Figure 3C:
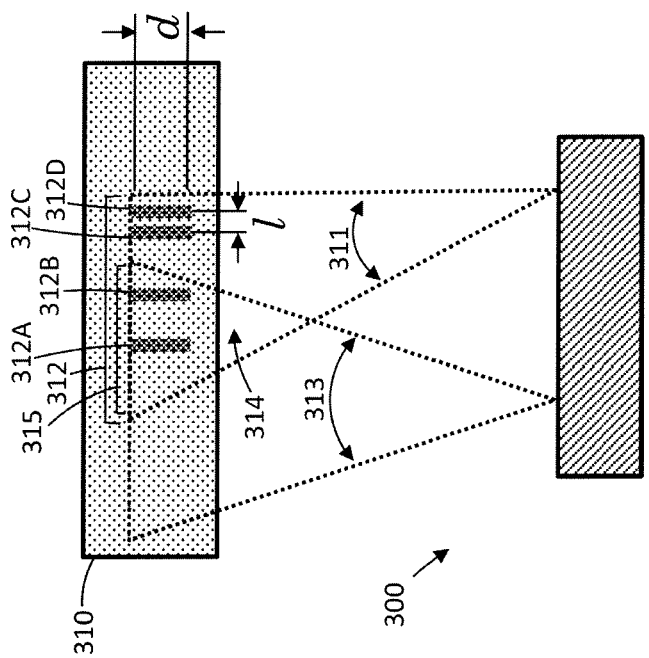

FIG. 3C and FIG. 3D depict the optoelectronic module 300 with different examples of illumination features 312A, 312B, 312C and 312D. The illumination features 312A, 312B, 312C and 312D can conform to different distances/with respect to each other such that the zone of linear response (i.e., the distance range where a linear change in photocurrent is generated) of the detector 302 as described above is increased. Further, as depicted in FIG. 3C and FIG. 3D, the emitter optical assembly 305 can be configured to produce the illumination features 312A, 312B, 312C and 312D, where the illumination features 312A, 312B, 312C and 312D conform to a particular dimension d. As depicted in FIG. 3C the dimension d can be the same for the illumination features 312A, 312B, 312C and 312D or as depicted in FIG. 3D the dimension d can be different with respect to each or some of the illumination features 312A, 312B, 312C and 312D such that the zone of linear response (i.e., the distance range where a linear change in photocurrent is generated) of the detector 302 as described above is increased or such that light emanating from the emitter 301 is utilized in a particularly efficient manner. Further, the intensity of each illumination feature 312A, 312B, 312C and 312D can be different with respect to each other such that the linear zone is enlarged. Still further, in other implementations, both the distance 1, dimension d, or intensity of the illumination features 312A, 312B, 312C and 312D can be varied to achieve either or both an increase in the linear zone, and/or a shift in the linear zone, and/or the utilization of light emanating from the emitter 301 in a particularly efficient manner.

Figure 4B:
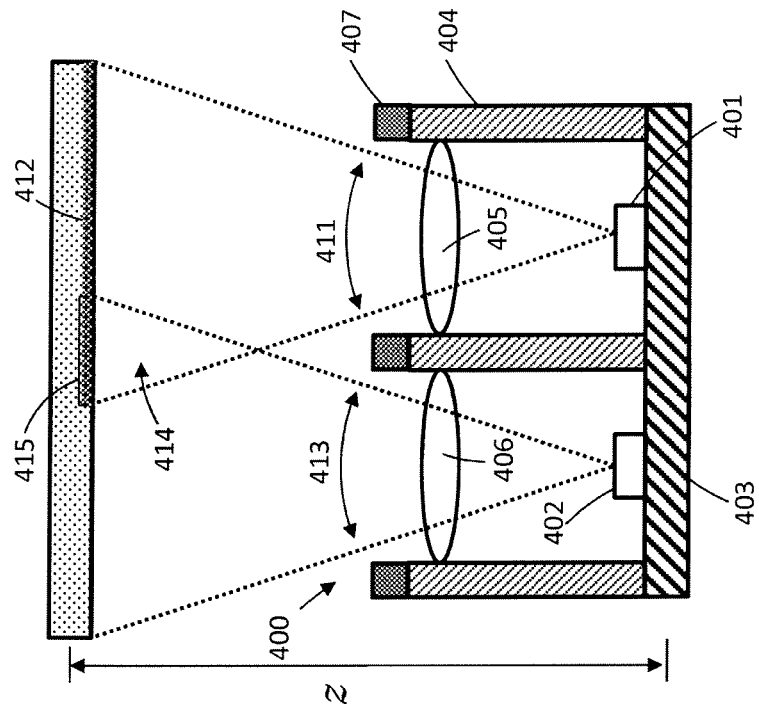
FIG. 4A and FIG. 4B depict an optoelectronic module with a modulated light source and a demodulation pixel in a first operation mode.
Figure 4A:
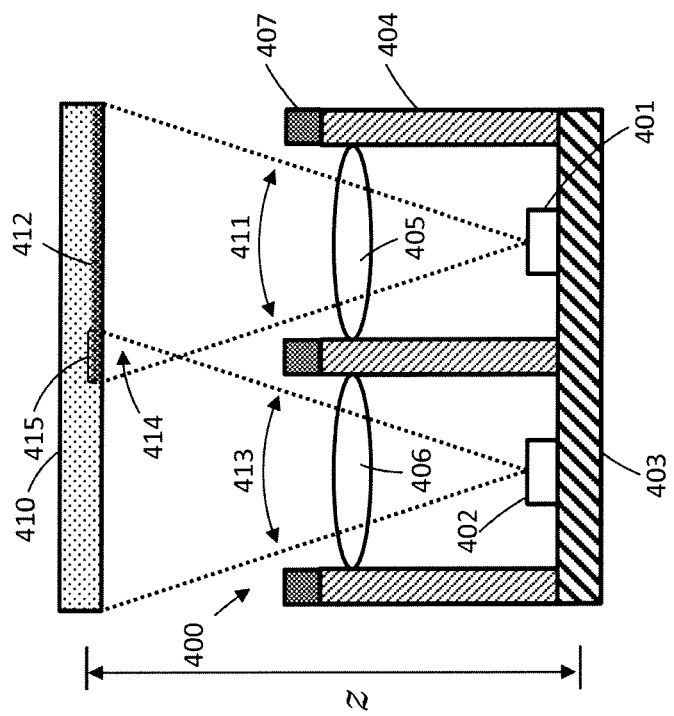

FIG. 4A depicts an optoelectronic module 400 operable to capture distance data. The optoelectronic module 400 includes an emitter 401 (such as a light emitting diode, edge emitting laser (EEL), vertical-cavity surface-emitting laser (VCSEL), or an array or combination of any of the aforementioned) and a detector 402 (such as a photodiode, intensity pixel, demodulation pixel, or an array or combination of any of the aforementioned) mounted on or integrated into a substrate 403 (such as PCB glass-fiber laminate, and/or silicon). The emitter 401 can be configured to produce any wavelength or range of wavelengths of electromagnetic radiation (e.g., visible or non-visible radiation such as near-, mid-, or far-infrared radiation). Further the emitter 401 can be configured to produce modulated light. Further the detector 402 can be configured to detect any wavelength or range of wavelengths of electromagnetic radiation (e.g., visible or non-visible radiation such as near-, mid-, or far-infrared radiation).

The emitter 401 and detector 402 can be surrounded laterally by a spacer 404. The spacer 404 is substantially non-transparent to wavelengths of light emitted by the emitter 401 and/or detectable by the detector 402. The spacer 404 can be manufactured, for example, from a curable polymeric material (such as epoxy) via injection molding, vacuum injection molding or other replication process, and can further contain substantially non-transparent filler and/or low-thermal-expansion filler (such as carbon black and/or inorganic filler). Further the spacer 404 can be manufactured from a substantially non-transparent wafer (such as a PCB glass-fiber laminate). The optoelectronic module 400 further includes an emitter optical assembly 405 aligned with the emitter 401, and a detector optical assembly 406 aligned with the detector 402. Each optical assembly 405, 406 can include any one of, or combinations of, the following optical elements: a diffraction grating, a microlens array, a lens, an anamorphic lens, a prism, a micro-prism array, a diffractive optical element or a plurality of any one of the aforementioned or their respective combinations. The optical elements within the optical assemblies 405, 406 can be manufactured, for example, from a curable polymeric material (such as epoxy) via injection molding, vacuum injection molding, or other replication process.

Each optical assembly 405, 406 can further include apertures, spectral filters, spacers, alignment features, and other components pertinent to their respective functions. The optical assemblies 405, 406 can be mounted or integrated within the spacer 404. The optoelectronic module 400 further can include a baffle 407. The baffle 407 is substantially non-transparent to wavelengths of light emitted by the emitter 401 and/or detectable by the detector 402. The baffle 407 can be manufactured from a curable polymeric material (such as epoxy) via injection molding, vacuum injection molding or other replication process, and can further contain substantially non-transparent filler and/or low-thermal-expansion filler (such as carbon black and/or inorganic filler). Further the baffle 407 can be manufactured from a substantially non-transparent wafer (such as a PCB glass-fiber laminate). The baffle 407 can mitigate the detrimental effects of stray light in some implementations. Further the baffle 407 can be configured with dimensions (e.g., height, thickness) that substantially prevent stray light from impinging the detector, while still allowing for optimal emitter, detector FOV 411, 413, respectively.

FIG. 4A further depicts an object 410 (such as a person or an appendage of a person) adjacent to the optoelectronic module 400 at a distance z. Light emanating from the emitter 401 and transmitting through the emitter optical assembly 405 conforms to an emitter FOV 411. Further light conforming to the emitter FOV 411 and incident on the object 410 delineates an illumination 412. Light that reflects from the object 410 can be detected by the detector 402 via the detector optical assembly 406 within a detector FOV 413. The regions where the emitter FOV 411 and the detector FOV 413 overlap delineate an overlap region 414. The lateral extent of the overlap region 414 defines a lateral overlap 415. Light reflected from the lateral overlap 415 and directed to the detector 402 can be used to determine distance in some implementations. In this example, the emitter 401 of the optoelectronic module 400 is depicted as a modulated light source (such as a source used for time of flight), and the detector 402 of the optoelectronic module 400 is depicted as a demodulation sensor (such as a sensor used for time-of-flight).

The optoelectronic module 400 can be used in two modes of operation. In a first mode of operation, the optoelectronic module 400 can capture distance data as described above; that is, an increase in the lateral overlap 415 can result in an increase in intensity of light reflected from the object 410 and collected by the detector 402. A detector 402 photocurrent response with respect to a range of distances can be correlated to the distance z between the optoelectronic module 400 and the object 410. An example of the aforementioned is depicted in FIG. 4A and FIG. 4B where the overlap region 414 and the lateral overlap 415 increases (from FIG. 4A to FIG. 4B) when the distance z increases (FIG. 4A to FIG. 4B). In this implementation, the detector 402 (which in this example is implemented as a demodulation sensor) can operate in an intensity sensitive mode. That is, the intensity of the light reflected from the object 410 and directed to the detector 402 can be used to determine distance as described above.

In a second mode of operation, optoelectronic module 400 can capture distance data via a time-of-flight technique. That is, modulated light (in this example) emanating from the emitter 401, incident on the object 410 and reflected to the detector 402 (e.g., a demodulation sensor) undergoes a phase shift. The phase shift can be detected and recorded by the detector 402 and can be correlated with distance z. The second mode of operation can be activated outside the linear zone described above; that is, outside of particular distances z that define the lower and upper extrema of the linear zone.

Figure 4C:
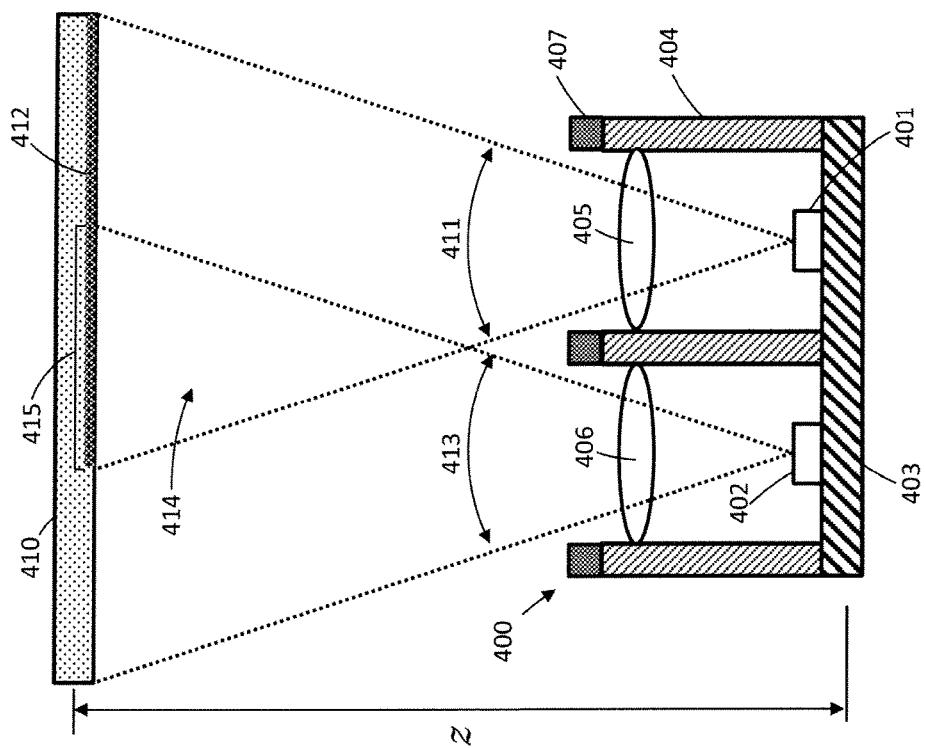
FIG. 4C depicts the optoelectronic module in a second operation mode.

For example, FIG. 4C depicts the optoelectronic module 400 at a third distance z (e.g., greater than the distances depicted in FIG. 4A and FIG. 4B) outside of the distances z that define the lower and upper extrema of the linear zone. In this example, the overlap region 414 is sufficiently large such that the illumination 412 incident on the object and the lateral overlap 415 are substantially equal. At distances z where the illumination 412 incident on the object and the lateral overlap 415 are substantially equal, distance data can be captured by the second mode of operation. In some implementations, the second mode of operation can be activated outside of the linear zone described above, while in other implementations the second mode of operation can be activated inside the linear zone described above (e.g., for calibration). The emitter 401 and the detector 402 are implemented as a modulated light source and a demodulation sensor, respectively, in this example. However, in other implementations, the emitter 401 and the detector 402 can be configured to determine distance z via pulse time-of-flight, or other distance capturing techniques.

Figure 5B:
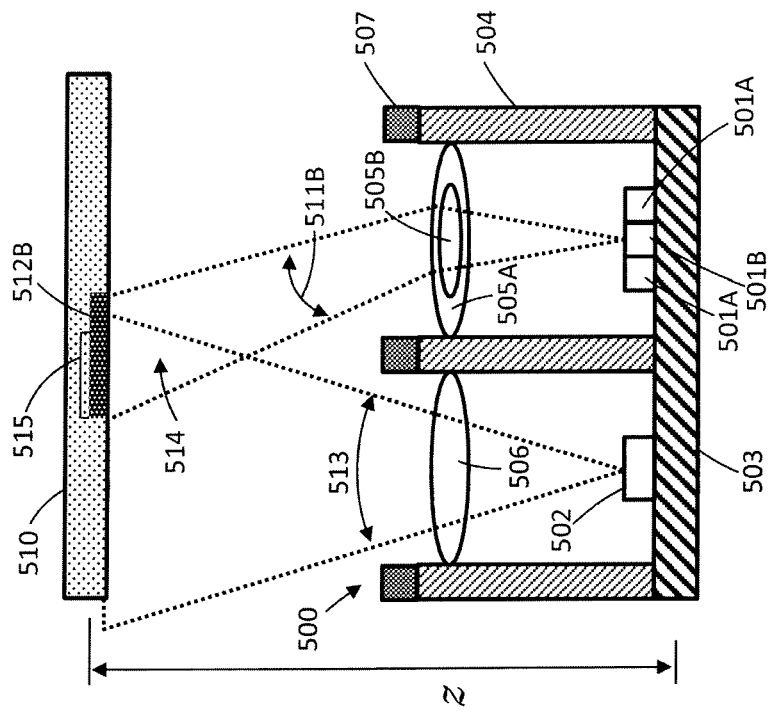
FIG. 5A-FIG. 5D depict optoelectronic modules with emitters composed of multiple light sources.
Figure 5A:
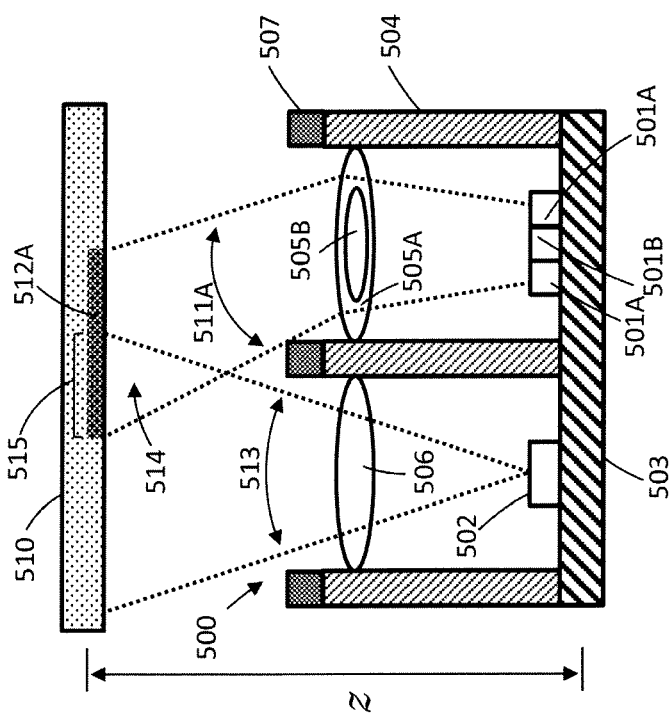

FIG. 5A depicts an optoelectronic module 500 operable to capture distance data. The optoelectronic module 500 includes an emitter 501 (such as a light emitting diode, edge emitting laser (EEL), vertical-cavity surface-emitting laser (VCSEL), or an array or combination of any of the aforementioned) and a detector 502 (such as a photodiode, intensity pixel, demodulation pixel, or an array or combination of any of the aforementioned) mounted on or integrated into a substrate 503 (such as PCB glass-fiber laminate, and/or silicon). The emitter 501 can be configured to produce any wavelength or range of wavelengths of electromagnetic radiation (e.g., visible or non-visible radiation such as near-, mid-, or far-infrared radiation). Further the emitter 501 can be configured to produce modulated light. Further the detector 502 can be configured to detect any wavelength or range of wavelengths of electromagnetic radiation (e.g., visible or non-visible radiation such as near-, mid-, or far-infrared radiation).

The emitter 501 and detector 502 can be surrounded laterally by a spacer 504. The spacer 504 is substantially non-transparent to wavelengths of light emitted by the emitter 501 and/or detectable by the detector 502. The spacer 504 can be manufactured from a curable polymeric material (such as epoxy) via injection molding, vacuum injection molding or other replication process, and can further contain substantially non-transparent filler and/or low-thermal-expansion filler (such as carbon black and/or inorganic filler). Further the spacer 504 can be manufactured from a substantially non-transparent wafer (such as a PCB glass-fiber laminate). The optoelectronic module 500 further includes an emitter optical assembly 505 aligned with the emitter 501, and a detector optical assembly 506 aligned with the detector 502. Each optical assembly 505, 506 can include any one of, or combinations of, the following optical elements: a diffraction grating, a microlens array, a lens, an anamorphic lens, a prism, a micro-prism array, a diffractive optical element or a plurality of any one of the aforementioned or their respective combinations. The optical elements within the optical assemblies 505, 506 can be manufactured, for example, from a curable polymeric material (such as epoxy) via injection molding, vacuum injection molding, or other replication process.

Each optical assembly 505, 506 can further include apertures, spectral filters, spacers, alignment features, and other components pertinent to their respective functions. The optical assemblies 505, 506 can be mounted or integrated within the spacer 504. The optoelectronic module 500 further can include a baffle 507. The baffle 507 is substantially non-transparent to wavelengths of light emitted by the emitter 501 and/or detectable by the detector 502. The baffle 507 can be manufactured from a curable polymeric material (such as epoxy) via injection molding, vacuum injection molding or other replication process, and can further contain substantially non-transparent filler and/or low-thermal-expansion filler (such as carbon black and/or inorganic filler). Further the baffle 507 can be manufactured from a substantially non-transparent wafer (such as a PCB glass-fiber laminate). The baffle 507 can mitigate the detrimental effects of stray light in some implementations. Further the baffle 507 can be configured with dimensions (e.g., height, thickness) that substantially prevent stray light from impinging the detector, while still allowing for optimal emitter, detector FOV 511, 513, respectively.

FIG. 5A further depicts an object 510 (such as a person or an appendage of a person) adjacent to the optoelectronic module 500 at a distance z. The optoelectronic module 500 includes an emitter 501 that is composed of first and second light sources 501A, 501B. The optoelectronic module 500 further includes an emitter optical assembly 505 that is composed of first and second optical regions 505A, 505B. Light produced from 501A can be transmitted through 505A of the emitter optical assembly 505. The transmitted light conforms to a first emitter FOV 511A. Further light conforming to the first emitter FOV 511A and incident on the object 510 delineates a first illumination 512A. Further, light produced from 501B can be transmitted through 505B of the emitter optical assembly 505. The transmitted light conforms to a second emitter FOV 511B. Further light conforming to the second emitter FOV 511B and incident on the object 510 delineates a second illumination 512B.

Light that reflects from the object 510 can be detected by the detector 502 via the detector optical assembly 506 within a detector FOV 513. The regions where the first and/or second emitter FOVs 511A, 511B and the detector FOV 513 overlap delineate an overlap region 514. The lateral extent of the overlap region 514 defines a lateral overlap 515. Light reflected from the lateral overlap 515 and directed to the detector 502 can be used to determine distance in some implementations. For example, an increase in object distance z, generates a corresponding increase in the overlap region 514 and a corresponding increase in the lateral overlap 515. An increase in the lateral overlap 515 can result in an increase in intensity of light reflected from the object 510 and collected by the detector 502. A detector 502 photocurrent response with respect to a range of distances can be correlated to the distance z between the optoelectronic module 500 and the object 510. The emitter 501 can be operable to emit light from first and second emitters 501A, 501B sequentially. In some cases, for example, in implementations where both first and second emitters 501A, 501B produce light of the same wavelength, the linear zone described above can be increased by the sequential operation of the first and second emitters 501A, 501B. This example implementation is depicted in FIG. 5A and FIG. 5B. The first emitter 501A emits light for a z or range of z, while the second emitter 501B depicted in FIG. 5B emits light for another z or range of z.

Figure 5C:
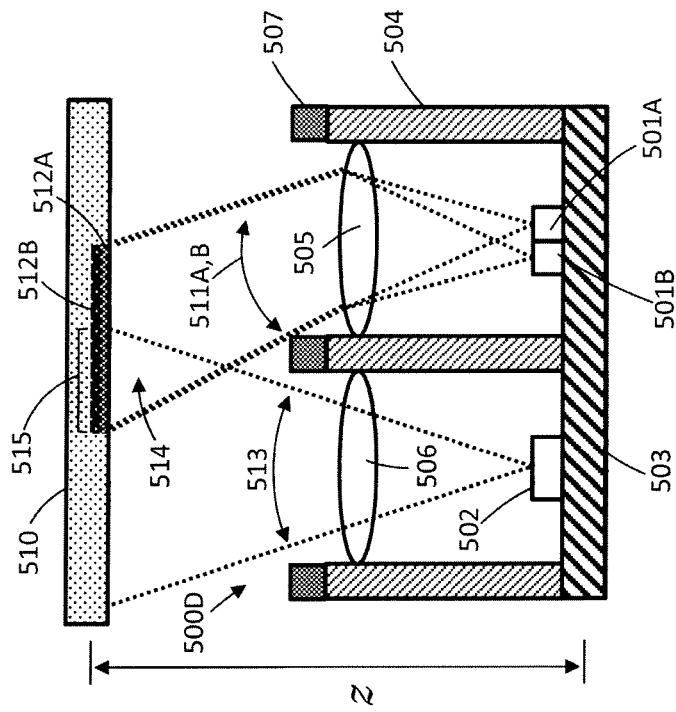

FIG. 5C depicts an example of an optoelectronic module 500C with an emitter 501 composed of first and second emitters 501A, 501B. In this example, first and second emitters 501A, 501B are configured to produce light of different wavelengths. The optoelectronic module 500 further includes an emitter optical assembly 505 that is composed of first and second optical regions 505A, 505B. Light produced from 501A can be transmitted through 505A of the emitter optical assembly 505. The transmitted light conforms to a first emitter FOV 511A. Further light conforming to the first emitter FOV 511A and incident on the object 510 delineates a first illumination 512A. Further, light produced from 501B can be transmitted through 505B of the emitter optical assembly 505. The transmitted light conforms to a second emitter FOV 511B. Further light conforming to the second emitter FOV 511B and incident on the object 510 delineates a second illumination 512B.

As explained above, light that reflects from the object 510 can be detected by the detector 502 via the detector optical assembly 506 within a detector FOV 513. The detector 502 can be configured to detect and distinguish between the different wavelengths of light produced by the first and second emitters 501A, 501B. The detector 502 can be implemented, for example, as a dual-junction photodiode. The emitters 501A, 501B can be operated sequentially in some instances, while in other instances the emitters 501A, 501B can operate simultaneously. The example optoelectronic module 500C depicted in FIG. 5C can be operable such that the linear zone of the photocurrent response described above is increased.

Figure 5D:
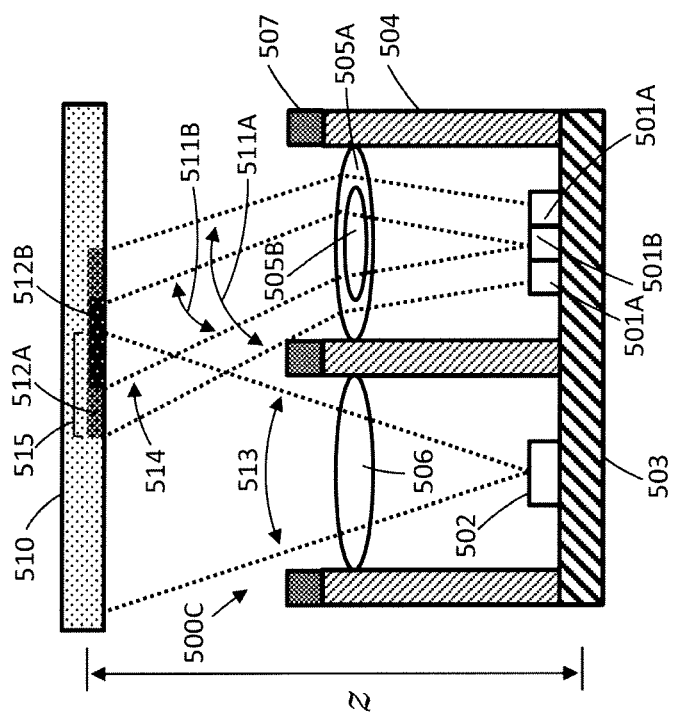

FIG. 5D depicts an example of an optoelectronic module 500D with an emitter 501 composed of first and second emitters 501A, 501B. In this example, first and second emitters 501A, 501B are configured to produce light of different wavelengths. The optoelectronic module 500 further includes an emitter optical assembly 505. Light produced from 501A can be transmitted through the emitter optical assembly 505. The transmitted light conforms to a first emitter FOV 511A. Further light conforming to the first emitter FOV 511A and incident on the object 510 delineates a first illumination 512A. Further, light produced from the second emitter 501B can be transmitted through emitter optical assembly 505. The transmitted light conforms to a second emitter FOV 511B. Further light conforming to the second emitter FOV 511B and incident on the object 510 delineates a second illumination 512B. In the example depicted in FIG. 5D the first and second emitter FOVs 511A, 511B are substantially the same.

As described above, light that reflects from the object 510 can be detected by the detector 502 via the detector optical assembly 506 within a detector FOV 513. The detector 502 can be configured to detect and distinguish between the different wavelengths of light produced by the first and second emitters 501A, 501B. The detector 502 can be implemented, for example, as a dual-junction photodiode. The emitters 501A, 501B can be operated sequentially in some instances, while in other instances the emitters 501A, 501B can operate simultaneously. The example optoelectronic module 500D depicted in FIG. 5D can be operable such that the linear zone of the photocurrent response described above is increased.

FIG. 6A depicts an optoelectronic module 600 operable to capture distance data. The optoelectronic module 600 includes an emitter 601 (such as a light emitting diode, edge emitting laser (EEL), vertical-cavity surface-emitting laser (VCSEL), or an array or combination of any of the aforementioned) and a detector 602 (such as a photodiode, intensity pixel, demodulation pixel, or an array or combination of any of the aforementioned) mounted on or integrated into a substrate 603 (such as PCB glass-fiber laminate, and/or silicon). The emitter 601 can be configured to produce any wavelength or range of wavelengths of electromagnetic radiation (e.g., visible or non-visible radiation such as near-, mid-, or far-infrared radiation). Further the emitter 601 can be configured to produce modulated light. Further the detector 602 can be configured to detect any wavelength or range of wavelengths of electromagnetic radiation (e.g., visible or non-visible radiation such as near-, mid-, or far-infrared radiation).

The emitter 601 and detector 602 can be laterally surrounded by a spacer 604. The spacer 604 is substantially non-transparent to wavelengths of light emitted by the emitter 601 and/or detectable by the detector 602. The spacer 604 can be manufactured, for example, from a curable polymeric material (such as epoxy) via injection molding, vacuum injection molding or other replication process, and can further contain substantially non-transparent filler and/or low-thermal-expansion filler (such as carbon black and/or inorganic filler). Further the spacer 604 can be manufactured from a substantially non-transparent wafer (such as a PCB glass-fiber laminate). The optoelectronic module 600 further includes an emitter optical assembly 605 aligned with the emitter 601, and a detector optical assembly 606 aligned with the detector 602. Each optical assembly 605, 606 can include any one of, or combinations of, the following optical elements: a diffraction grating, a microlens array, a lens, an anamorphic lens, a prism, a micro-prism array, a diffractive optical element or a plurality of any one of the aforementioned or their respective combinations. The optical elements within the optical assemblies 605, 606 can be manufactured, for example, from a curable polymeric material (such as epoxy) via injection molding, vacuum injection molding, or other replication process.

Each optical assembly 605, 606 can further include apertures, filter, spacers, alignment features, and other components pertinent to their respective functions. The optoelectronic module 600 further includes an optical assembly housing 607. The optical assemblies 605, 606 can be mounted or integrated within the optical assembly housing 607. The optical assembly housing 607 is substantially non-transparent to wavelengths of light emitted by the emitter 601 and/or detectable by the detector 602. The optical assembly housing 607 can be manufactured from a curable polymeric material (such as epoxy) via injection molding, vacuum injection molding or other replication process, and can further contain substantially non-transparent filler and/or low-thermal-expansion filler (such as carbon black and/or inorganic filler). Further the optical assembly housing 607 can be manufactured from a substantially non-transparent wafer (such as a PCB glass-fiber laminate). The optoelectronic module 600 further can include a cover glass 608. The cover glass 608 can be composed of a substantially transparent material (such as inorganic glass, sapphire, alumina, or other substantially transparent materials such as polymeric materials). The optoelectronic module 600 further can include an aperture 609. The aperture 609 can be composed of a substantially non-transparent material (such as black chrome). The aperture 609 can be formed, for example, on the cover glass 608 via photolithography. Still further in other implementations, the aperture 609 can be printed on to the cover glass 608, or can be formed via laser blackening on the cover glass 608. The aperture 609 can mitigate detrimental effects of stray light in some implementations.

FIG. 6A further depicts an object 610 (such as a person or an appendage of a person) adjacent to the optoelectronic module 600 at a distance z. Light emanating from the emitter 601 and transmitting through the emitter optical assembly 605 conforms to an emitter FOV 611. Further, light conforming to the emitter FOV 611 and incident on the object 610 delineates an illumination 612. Light that reflects from the object 610 can be detected by the detector 602 via the detector optical assembly 606 within a detector FOV 613. The regions where the emitter FOV 611 and the detector FOV 613 overlap delineate an overlap region 614. The lateral extent of the overlap region 614 defines a lateral overlap 615. Light reflected from the lateral overlap 615 and directed to the detector 602 can be used to determine distance in some implementations. For example, an increase in object distance z, generates a corresponding increase in the overlap region 614 and a corresponding increase in the lateral overlap 615. An increase in the lateral overlap 615 can result in an increase in intensity of light reflected from the object 610 and collected by the detector 602. A detector 602 photocurrent response with respect to a range of distances can be correlated to the distance z between the optoelectronic module 600 and the object 610.

FIG. 6B depicts an optoelectronic module 600 operable to capture distance data with a spectral filter 616 mounted onto the cover glass 608. The spectral filter 616 can be substantially transmissive to certain wavelengths or ranges of wavelengths of light emanating from the emitter 601, while being substantially non-transmissive to certain other wavelengths or wavelengths of light emanating from the emitter 601. In some examples, the spectral filter can be implemented as an organic material (such as a photoresist) while in other examples the spectral filter can be implemented as an inorganic material (such as a dielectric material). The spectral filter 616 can be formed by, for example, photolithography, while in other instances the spectral filter 616 can be formed by sputtering or other deposition techniques.

Figure 7B:
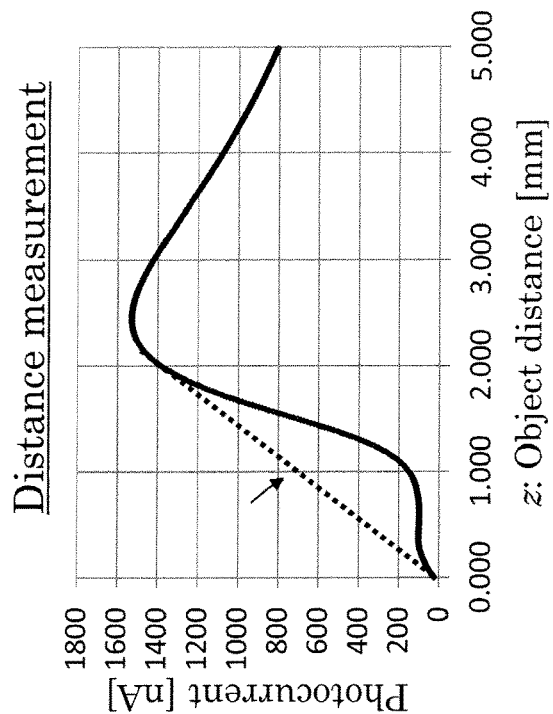
FIG. 7B depicts an example plot of photocurrent response with respect to a range of target distances.
Figure 7A:
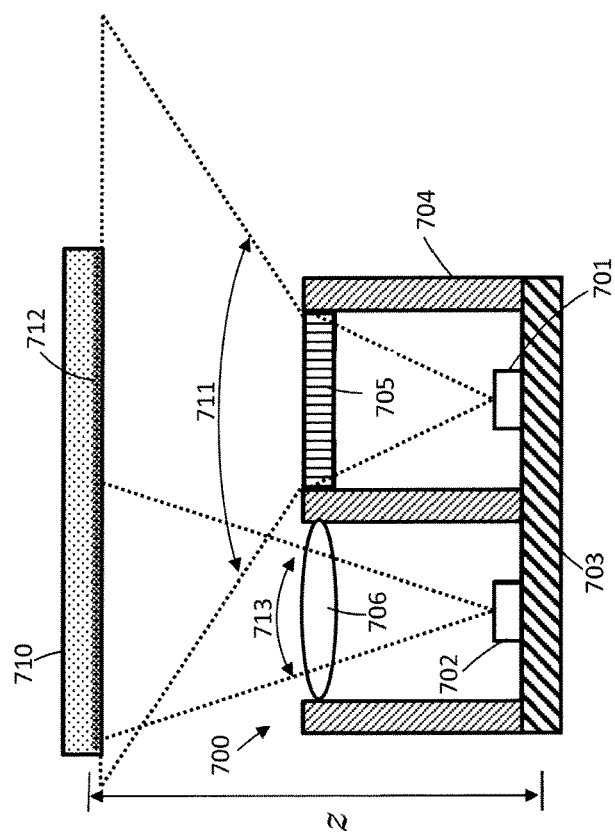
FIG. 7A depicts an optoelectronic module with a diffuser.

FIG. 7A depicts an optoelectronic module 700 operable to capture distance data. The optoelectronic module 700 includes an emitter 701 (such as a light emitting diode, edge emitting laser (EEL), vertical-cavity surface-emitting laser (VCSEL), or an array or combination of any of the aforementioned) and a detector 702 (such as a photodiode, intensity pixel, demodulation pixel, or an array or combination of any of the aforementioned) mounted on or integrated into a substrate 703 (such as PCB glass-fiber laminate, and/or silicon). The emitter 701 can be configured to produce any wavelength or range of wavelengths of electromagnetic radiation (e.g., visible or non-visible radiation such as near-, mid-, or far-infrared radiation). Further the emitter 701 can be configured to produce modulated light. Further the detector 702 can be configured to detect any wavelength or range of wavelengths of electromagnetic radiation (e.g., visible or non-visible radiation such as near-, mid-, or far-infrared radiation).

The emitter 701 and detector 702 can be surrounded laterally by a spacer 704. The spacer 704 is substantially non-transparent to wavelengths of light emitted by the emitter 701 and/or detectable by the detector 702. The spacer 704 can be manufactured, for example, from a curable polymeric material (such as epoxy) via injection molding, vacuum injection molding or other replication process, and can further contain substantially non-transparent filler and/or low-thermal-expansion filler (such as carbon black and/or inorganic filler). Further the spacer 704 can be manufactured from a substantially non-transparent wafer (such as a PCB glass-fiber laminate). The optoelectronic module 700 further includes an emitter optical assembly 705 aligned with the emitter 701, and a detector optical assembly 706 aligned with the detector 702. Each optical assembly 705, 706 can include any one of, or combinations of, the following optical elements: a diffraction grating, a microlens array, a lens, an anamorphic lens, a prism, a micro-prism array, a diffractive optical element or a plurality of any one of the aforementioned or their respective combinations. The optical elements within the optical assemblies 705, 706 can be manufactured, for example, from a curable polymeric material (such as epoxy) via injection molding, vacuum injection molding, or other replication process. Each optical assembly 705, 706 can further include apertures, filter, spacers, alignment features, and other components pertinent to their respective functions. The optical assemblies 705, 706 can be mounted or integrated within the spacer 704.

FIG. 7A further depicts an object 710 (such as a person or an appendage of a person) adjacent to the optoelectronic module 700 at a distance z. Light emanating from the emitter 701 and transmitting through the emitter optical assembly 705 conforms to an emitter FOV 711. The emitter optical assembly 705 is implemented as a diffuser in the example optoelectronic module depicted in FIG. 7A; consequently, the emitter FOV 711 can be substantial (e.g., greater than 160°). Light conforming to the emitter FOV 711 and incident on the object 710 delineates an illumination 712. Light that reflects from the object 710 can be detected by the detector 702 via the detector optical assembly 706 within a detector FOV 713. The regions where the emitter FOV 711 and the detector FOV 713 overlap delineate an overlap region 714. The lateral extent of the overlap region 714 defines a lateral overlap 715. Light reflected from the lateral overlap 715 and directed to the detector 702 can be used to determine distance in some implementations. For example, an increase in object distance z, generates a corresponding increase in the overlap region 714 and a corresponding increase in the lateral overlap 715. An increase in the lateral overlap 715 can result in an increase in intensity of light reflected from the object 710 and collected by the detector 702. A detector 702 photocurrent response with respect to a range of distances can be correlated to the distance z between the optoelectronic module 700 and the object 710. In some implementations, the substantial emitter FOV 711 can increase the range of linear response as depicted by the dotted line (and arrow) in FIG. 7B. FIG. 7B depicts an illustration of photocurrent responses of a typical emitter FOV (the solid black line) and the emitter FOV 711 (dotted line). In this example, the zone of linear response is extended by the substantial FOV 711.

Figure 8B:
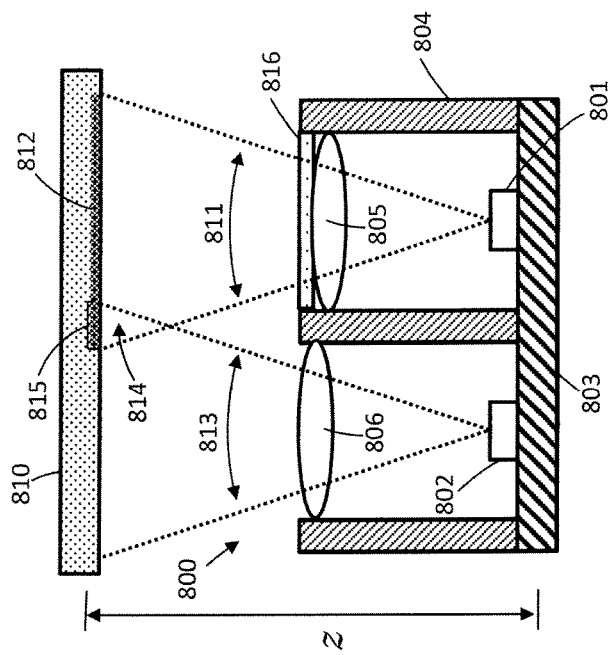
FIG. 8B depicts an optoelectronic module with a filter.
Figure 8A:
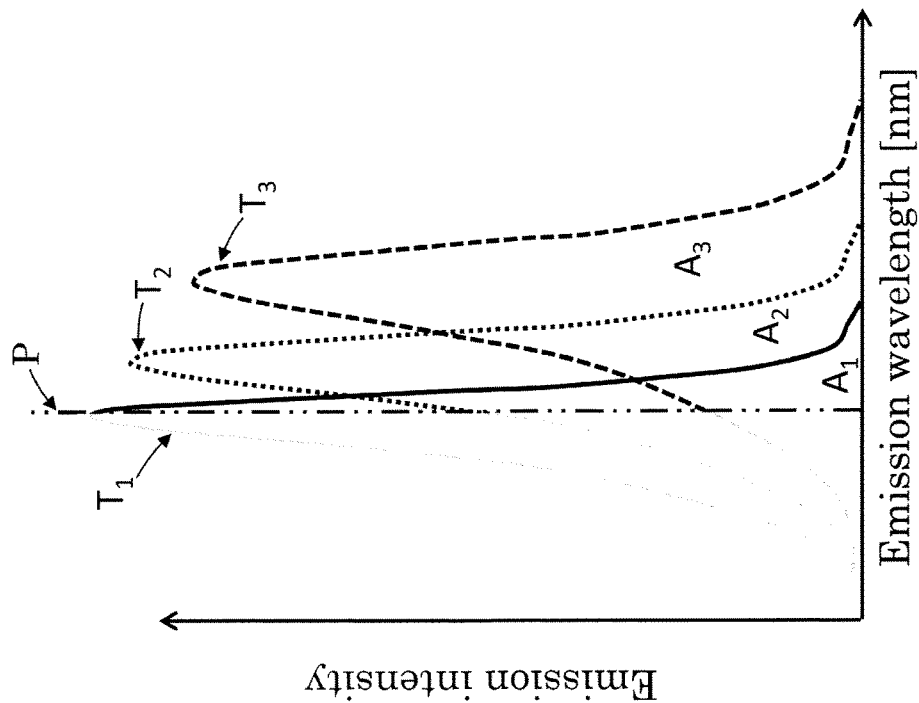
FIG. 8A depicts an example plot of emission intensity verses emission wavelength for an optoelectronic module implemented with a filter operating at three different temperatures.

FIG. 8A depicts an example plot of emission intensity verses emission wavelength for an emitter operating at three different temperatures ($T_1$, $T_2$, $T_3$). FIG. 8B depicts an optoelectronic module operable to capture distance data. The optoelectronic module 800 includes an emitter 801 (such as a light emitting diode, edge emitting laser (EEL), vertical-cavity surface-emitting laser (VCSEL), or an array or combination of any of the aforementioned) and a detector 802 (such as a photodiode, intensity pixel, demodulation pixel, or an array or combination of any of the aforementioned) mounted on or integrated into a substrate 803 (such as PCB glass-fiber laminate, and/or silicon). The emitter 801 can be configured to produce any wavelength or range of wavelengths of electromagnetic radiation (e.g., visible or non-visible radiation such as near-, mid-, or far-infrared radiation). Further the emitter 801 can be configured to produce modulated light. Further the detector 802 can be configured to detect any wavelength or range of wavelengths of electromagnetic radiation (e.g., visible or non-visible radiation such as near-, mid-, or far-infrared radiation).

The emitter 801 and detector 802 can be surrounded laterally by a spacer 804. The spacer 804 is substantially non-transparent to wavelengths of light emitted by the emitter 801 and/or detectable by the detector 802. The spacer 804 can be manufactured, for example, from a curable polymeric material (such as epoxy) via injection molding, vacuum injection molding or other replication process, and can further contain substantially non-transparent filler and/or low-thermal-expansion filler (such as carbon black and/or inorganic filler). Further the spacer 804 can be manufactured from a substantially non-transparent wafer (such as a PCB glass-fiber laminate). The optoelectronic module 800 further includes an emitter optical assembly 805 aligned with the emitter 801, and a detector optical assembly 806 aligned with the detector 802. Each optical assembly 805, 806 can include any one of, or combinations of, the following optical elements: a diffraction grating, a microlens array, a lens, an anamorphic lens, a prism, a micro-prism array, a diffractive optical element or a plurality of any one of the aforementioned or their respective combinations. The optical elements within the optical assemblies 105, 106 can be manufactured, for example, from a curable polymeric material (such as epoxy) via injection molding, vacuum injection molding, or other replication process. Each optical assembly 105, 106 can further include apertures, filter, spacers, alignment features, and other components pertinent to their respective functions. The optical assemblies 805, 806 can be mounted or integrated within the spacer 804.

FIG. 8A further depicts an object 810 (such as a person or an appendage of a person) adjacent to the optoelectronic module 800 at a distance z. Light emanating from the emitter 801 and transmitting through the emitter optical assembly 805 conforms to an emitter field-of-view (FOY) 811. Further, light conforming to the emitter FOV 811 and incident on the object 810 delineates an illumination 812. Light that reflects from the object 810 can be detected by the detector 802 via the detector optical assembly 806 within a detector FOV 813. The regions where the emitter FOV 811 and the detector FOV 813 overlap delineate an overlap region 814. The lateral extent of the overlap region 814 defines a lateral overlap 815. Light reflected from the lateral overlap 815 and directed to the detector 802 can be used to determine distance in some implementations. For example, an increase in object distance z, generates a corresponding increase in the overlap region 814 and a corresponding increase in the lateral overlap 815. An increase in the lateral overlap 815 can result in an increase in intensity of light reflected from the object 810 and collected by the detector 802. A detector 802 photocurrent response with respect to a range of distances can be correlated to the distance z between the optoelectronic module 800 and the object 810.

An optoelectronic module, for example the optoelectronic module depicted in FIG. 8B, can be subjected to a range of ambient/operating temperatures. The emitter 801 efficiency and emission wavelength can vary with ambient/operating temperature. The emission intensity of an emitter implemented as an LED, for example, can decrease with an increase in ambient/operating temperature. Further, the emission wavelength can increase with an increase in ambient/operating temperature. Such an example, is illustrated in FIG. 8A. Moreover, the efficiency (e.g., sensitivity) of a detector 802 implemented, for example, as a photodiode can increase with increasing ambient/operating temperature. Accordingly, the photocurrent response, in particular the linear zone described above, can vary for different operating/ambient temperatures. In some implementations, such variations can cause inaccuracies of measured distances z, and/or increase complications and/or computational, processing requirements of signals collected by the detector 802.

Accordingly, the optoelectronic module 800 depicted in FIG. 8B further includes a filter 816. In this example, the filter can be implemented as a filter the passes wavelengths greater than a particular wavelength and blocks or substantially attenuates wavelengths less than the particular wavelength. The dot-dash line P depicted in FIG. 8A corresponds to the particular wavelength. The areas $A_1$, $A_2$, and $A_3$ are defined as the areas bounded by the dot-dash line P (the lower limit) and the curves corresponding to respective temperatures $T_1$, $T_2$, and $T_3$ (the upper limit). In some cases, the particular wavelength (x-intercept) of the dot-dash line P is determined such that the areas $A_1$, $A_2$, and $A_3$ are substantially equal. In other cases, the particular wavelength (x-intercept) of the dot-dash line P is determined such that the photocurrent response described above is substantially invariant for different ambient/operating temperatures.

The various implementation of the optoelectronic modules described in the above examples may further include, processors, other electrical components or circuit elements (e.g., transistors, resistors, capacitive and inductive elements) pertinent to the function of the optoelectronic modules and apparent to a person of ordinary skill in the art.

Although the present disclosure has been described in detail with respect to various implementations described above, other implementations including combinations and/or subtractions of various described features above, are possible. Thus, other implementations are within the scope of the claims.

What is claimed is:

1. An optoelectronic module comprising:
   an emitter operable to produce light;
   an emitter optical assembly aligned with the emitter so as to illuminate an object outside the module with light produced by the emitter;
   a detector operable to detect light at one or more wavelengths produced by the emitter; and
   a detector optical assembly aligned with the detector so as to direct light reflected by the object toward the detector;
   the emitter optical assembly and the emitter being operable, in combination, to expand a range of distances between the optoelectronic module and the object for which photocurrent response of the detector is linear, wherein the linear photocurrent response detected by the detector is correlated to a distance between the optoelectronic module and the object, and wherein the range of distances for which the photocurrent response of the detector is linear is expanded relative to a range of distances between the optoelectronic module and the object for which the photocurrent response of the detector is linear in the absence of the emitter optical assembly.

2. The optoelectronic module of claim 1 wherein the emitter optical assembly includes an anamorphic lens element, the optical assembly and the emitter being operable to tilt an emitter field of view toward the detector.

3. The optoelectronic module of claim 1, the optical assembly and the emitter being operable to cast an illumination of laterally varying intensity onto the object.

4. The optoelectronic module of claim 1 wherein the emitter optical assembly includes an optical element operable to cast an illumination having discrete illumination features.

5. The optoelectronic module of claim 4 wherein the optical element includes a diffractive optical element.

6. The optoelectronic module of claim 4 wherein each one of the discrete illumination features is operable to produce a respective stepped photocurrent response when detected by the detector.

7. The optoelectronic module of claim 4 wherein at least one of the discrete illumination features has an intensity that differs from another one of the discrete illumination features.

8. The optoelectronic module of claim 1 wherein illumination from the module cast on the object includes geometric shapes or a series of shapes.

* * * * *